United States Patent [19]
Mors et al.

[11] Patent Number: 5,491,944
[45] Date of Patent: Feb. 20, 1996

[54] EMBEDDED UNIT IN A CONCRETE FOUNDATION

[75] Inventors: Helmut Mors; Stefan Mueller, both of Friedrichshafen; Adolf Krammer, Markdorf, all of Germany

[73] Assignee: MTU Motoren- Und Turbinen-Union Friedrichshafen GmbH, Friedrichshafen, Germany

[21] Appl. No.: 232,074

[22] PCT Filed: Oct. 16, 1992

[86] PCT No.: PCT/DE92/00871
§ 371 Date: Jul. 27, 1994
§ 102(e) Date: Jul. 27, 1994

[87] PCT Pub. No.: WO93/08425
PCT Pub. Date: Apr. 29, 1993

[30] Foreign Application Priority Data

Oct. 26, 1991 [DE] Germany ............ 41 35 370.6

[51] Int. Cl.$^6$ .................................................. E02D 27/32
[52] U.S. Cl. .............. 52/295; 52/167.7; 248/679; 248/636
[58] Field of Search .......... 52/295, 299, 167.7, 52/167.8; 248/678, 679, 638, 636, 633

[56] References Cited

U.S. PATENT DOCUMENTS

| 3,190,041 | 6/1965 | Kimball .................. 248/679 |
| 3,334,850 | 8/1967 | Jackson et al. ............ 248/679 |
| 3,477,668 | 11/1969 | Tippmann . |
| 4,682,754 | 7/1987 | Ebata et al. .............. 248/639 |
| 4,823,522 | 4/1989 | White .................... 52/167.7 |

FOREIGN PATENT DOCUMENTS

| 2371610 | 6/1978 | France . |
| 3345506 | 8/1987 | Germany . |
| 419738 | 3/1967 | Switzerland . |

*Primary Examiner*—Kien T. Nguyen
*Attorney, Agent, or Firm*—Evenson, McKeown, Edwards & Lenahan

[57] ABSTRACT

An embedded unit for a concrete foundation is used for the fixing of elastic machine bearing elements in the concrete foundation. The embedded unit is constructed from a plurality of rods and metal sheets which are fitted together while forming damping joints. This type of an embedded unit dampens the machine vibrations entering into the foundation, may have a high impedance, and can be sufficiently anchored in concrete material.

17 Claims, 3 Drawing Sheets

EMBEDDED UNIT IN A CONCRETE FOUNDATION

BACKGROUND AND SUMMARY OF THE INVENTION

The invention relates to a supporting and fixing arrangement for an elastic bearing element of a machine. The arrangement is poured into a concrete foundation as an embedded unit.

It is presently known to use plugs entered in a foundation for the screwed connection of the bearing element with the foundation. Also known are the use of solid bodies poured into the foundation and provided with tapholes, or welded steel constructions also cast with concrete and provided with tapholes.

Although these known fixing mechanisms ensure a mechanical connection with the foundation, they contribute very little to the reduction of the supported machine's vibration amplitudes. The vibration amplitudes existing at the outlet of the elastic bearing element are therefore introduced into the foundation in an almost unreduced manner.

It is an object of the present invention to anchor the embedded unit securely in the foundation and to provide it with an effective damping so that, as early as when the vibrations are introduced into the foundation, their amplitudes are reduced and resonance ratios are also effectively reduced. In this case, high-frequency vibrations are to be countered with input impedance (vibration resistance) by a large mass of the embedded unit.

This object is achieved by a supporting and fixing arrangement, which is poured as an embedded unit into a concrete foundation, for an elastic bearing element of a machine. The embedded unit comprises a plurality of rods and metal sheets which are connected with one another while forming damping joints. The damping joints are arranged between the surfaces of the parts and are filled with concrete material during the pouring-in of the concrete.

The embedded unit therefore has a very fissured structure, having a surface which is enlarged in comparison to a solid body. This permits a significantly improved anchoring in the foundation.

The joints of the structure, which are filled with concrete during the pouring, form damping joints which provide an efficient damping of the vibrations even during the introduction of the vibrations into the foundation. The mass of the embedded unit and therefore its impedance with respect to high-frequency vibrations can be constructed to be sufficiently large.

A further advantage of the present invention is that the embedded unit comprises a grid made of individual rods which have tapholes for the fastening of the elastic bearing element and between which metal sheets are arranged which project into the concrete material. The surfaces of the rods assigned to the bearing element and the front edges of the metal sheets are situated in a plane with the surface of the concrete foundation.

Another advantage is that the embedded unit comprises individual rods with tapholes for fastening of the elastic bearing element. The rods are arranged transversely with respect to a plurality of metal sheets projecting into the concrete material and are connected with them in a form-locking manner. The surfaces of the rods assigned to the bearing element and the front edges of the metal sheets are situated in a plane with the surface of the concrete foundation.

Yet another advantage is that the metal sheets have a U-shaped construction. The two legs project into the concrete material.

A still further advantage is that the rods and metal sheets are fitted together by means of interrupted weld seams and weld points while forming damping joints between the adjacent surfaces.

It is a further advantage that the plurality of rods and metal sheets are clamped together by screw bolts while forming damping joints.

Also, an advantage is that the damping joints are formed by spacers.

Other objects, advantages and novel features of the present invention will become apparent from the following detailed description of the invention when considered in conjunction with the accompanying drawings.

BRIEF DESCRIPTION OF TEE DRAWINGS

DETAILED DESCRIPTION OF THE PREFERRED EMBODIMENTS

Figure 1:
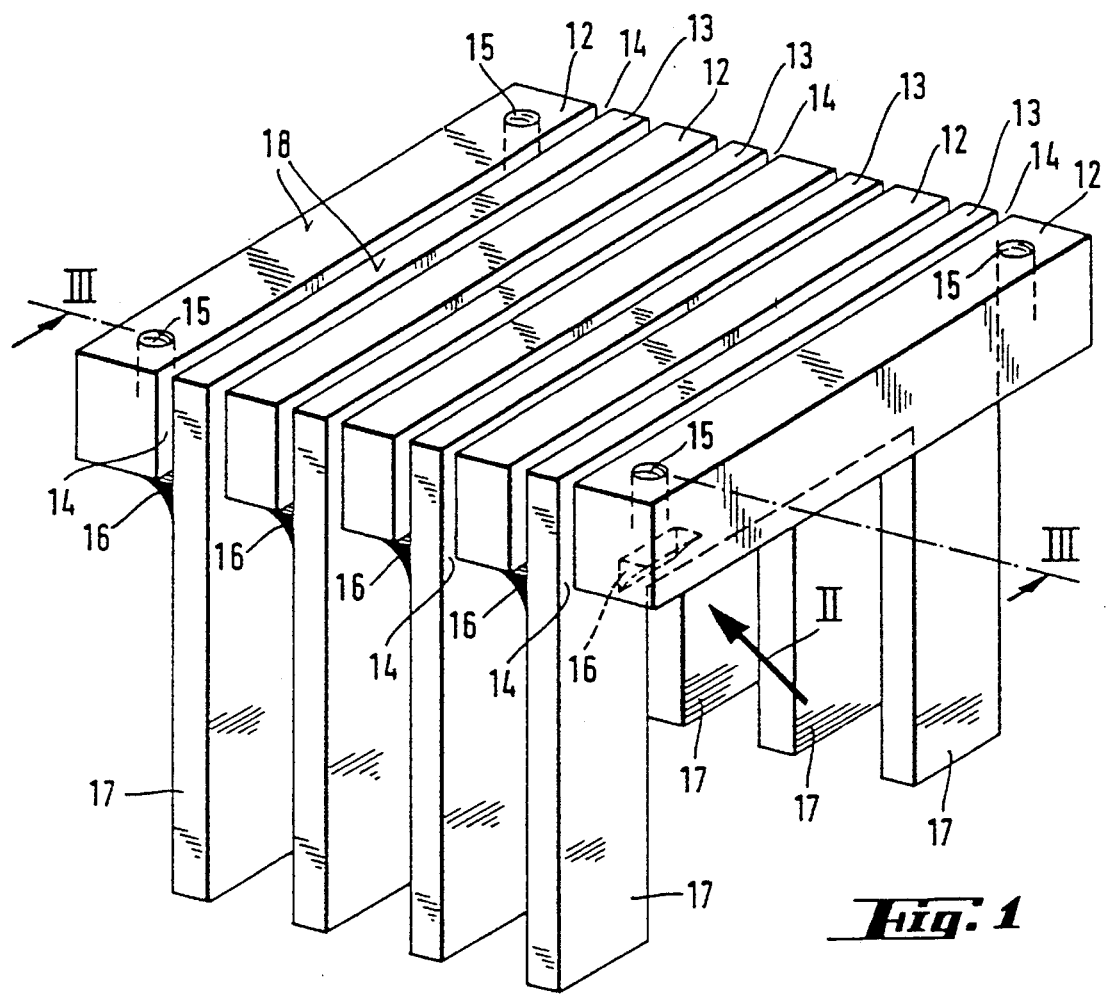
FIG. 1 is a perspective representation of an embedded unit comprising a grid formed of rods and metal sheets.
Figure 2:
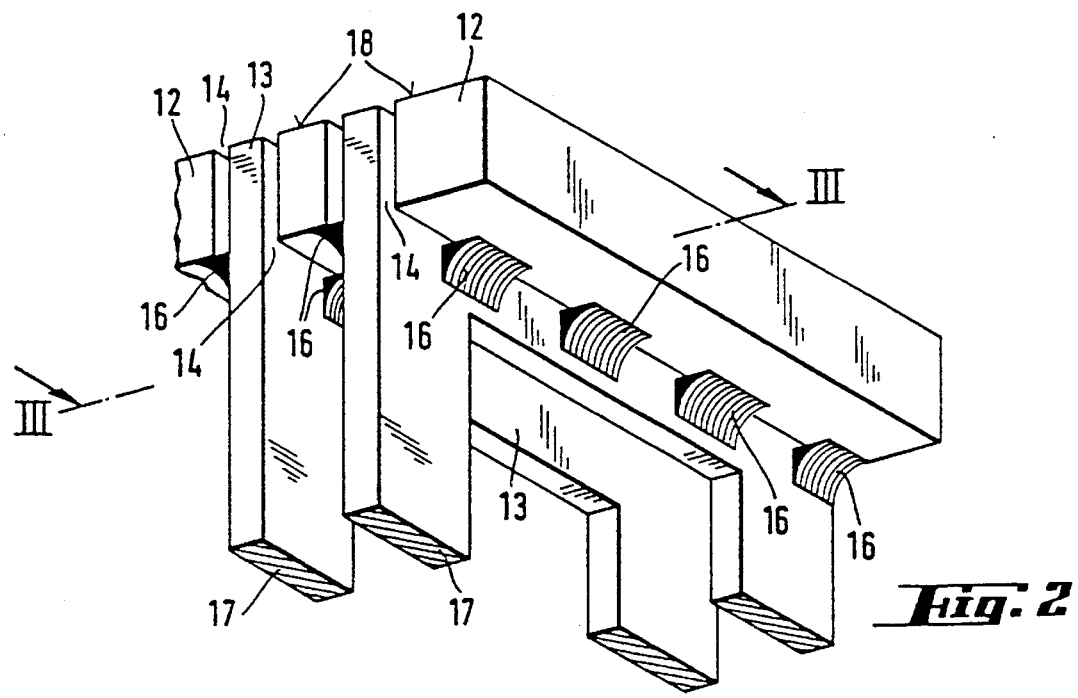
FIG. 2 is a perspective representation of a detail view of FIG. 1 taken in the direction of arrow II in FIG. 1.
Figure 3:
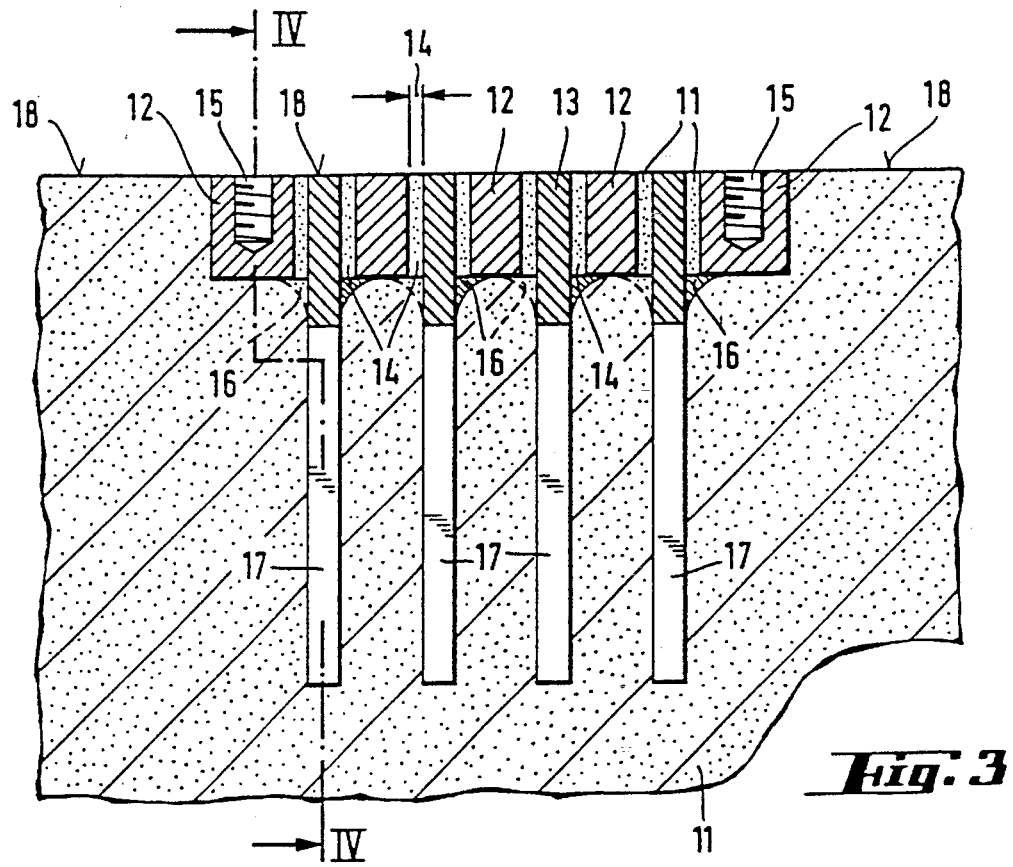
FIG. 3 is a longitudinal sectional view corresponding to III—III Of FIG. 1.
Figure 4:
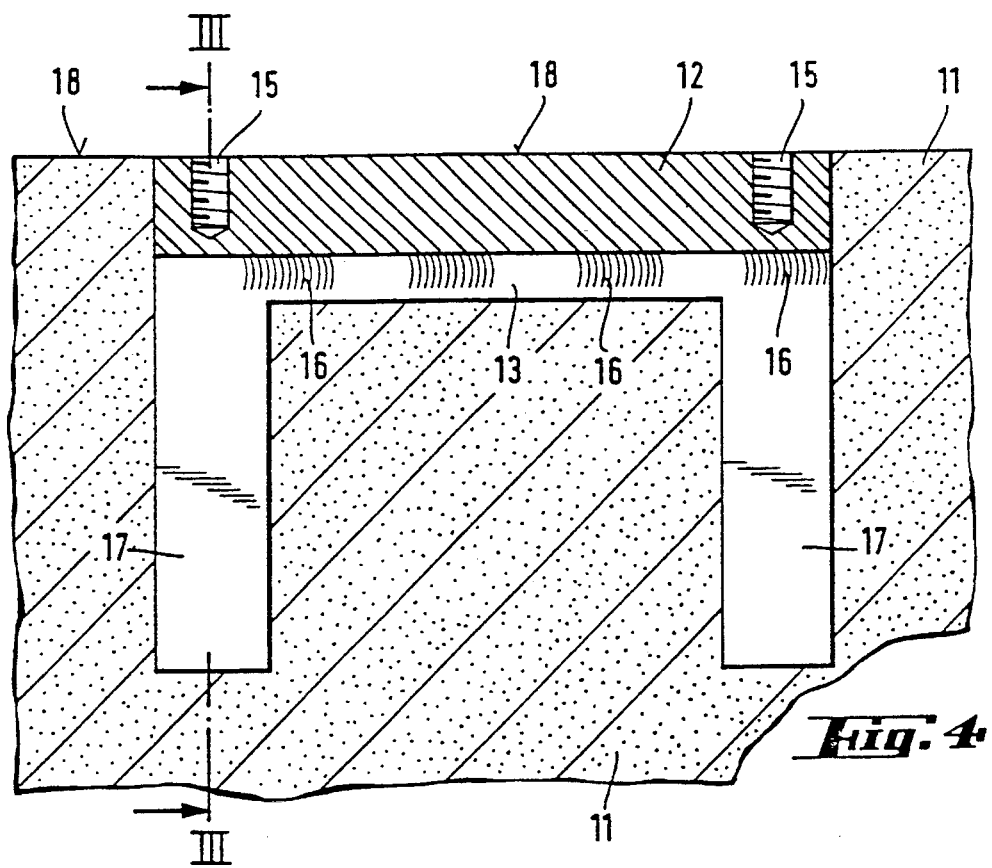
FIG. 4 is a cross-sectional view of the embedded unit of FIGS. 1 to 3 corresponding to Line IV—IV in FIG. 3.

In all of the drawings, the concrete material forming the foundation has the reference number 11. The foundation can be either a bed foundation or an intermediate foundation for a double-elastic bearing of a machine. In addition, all types of concrete can be used for the pouring-in of the embedded units. Thus, in addition to hydraulic concrete, reaction resin concrete as it is used for the damping of vibrations, for example, in machine tool building can be used. For the bearing of a machine, a plurality of embedded units is required which comprise elastic bearing elements.

According to the present invention, the embedded unit comprises a plurality of rods 12 and metal sheets 13 which are connected with one another while forming damping joints 14 arranged between the individual surfaces. Concrete material 11 penetrates into the damping joints 14 during the pouring-out. Tapholes 15 are used for the fastening of an elastic element (not shown) by means of which the machine is supported and fixed on the foundation.

In FIGS. 1 through 4, the embedded unit consists of a grid made of individual rods 12 which have tapholes 15. Metal sheets 13 are arranged between the rods 12. The front edges of the metal sheets 13 are situated in a plane 18 with the surfaces of the rods 12 and the surface of the foundation 11. The metal sheets 13 have a U-shaped construction, their legs 17 projecting into the concrete material 11. The rods 12 and metal sheets 13 are connected with one another via interrupted weld seams 16 while forming damping joints 14.

Figure 5:
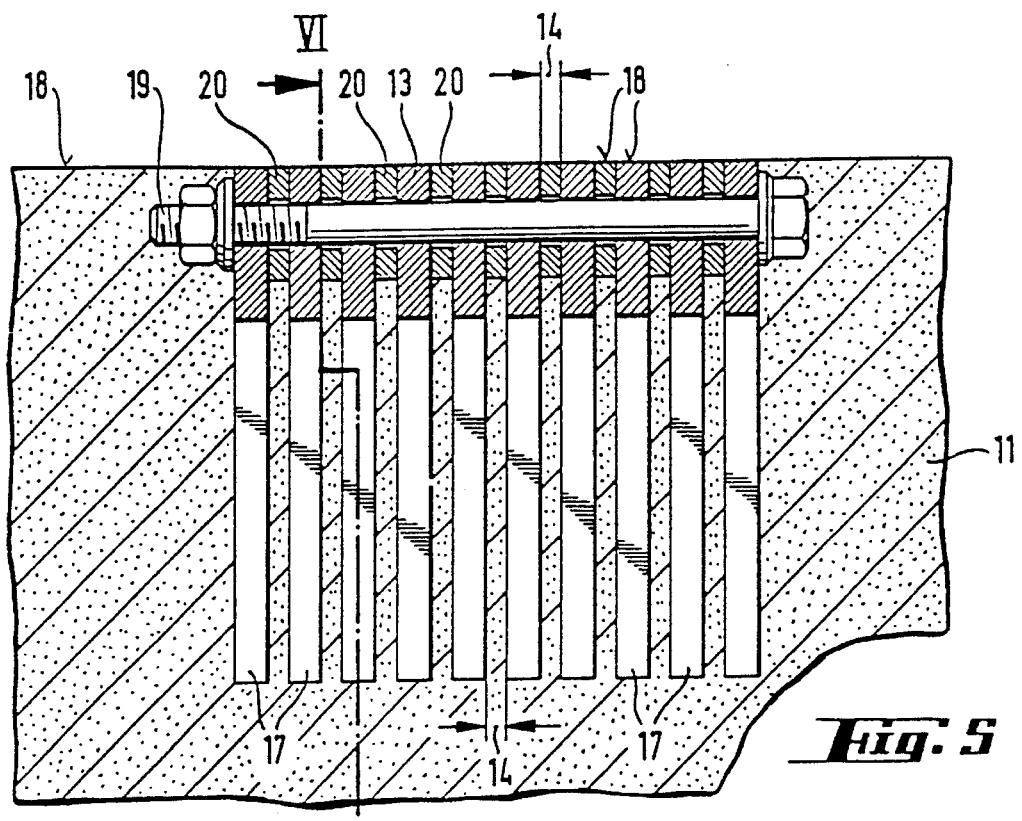
FIG. 5 is a longitudinal sectional view of another embodiment of an embedded unit in which the rods are connected with the metal sheets in a form-locking manner.
Figure 6:
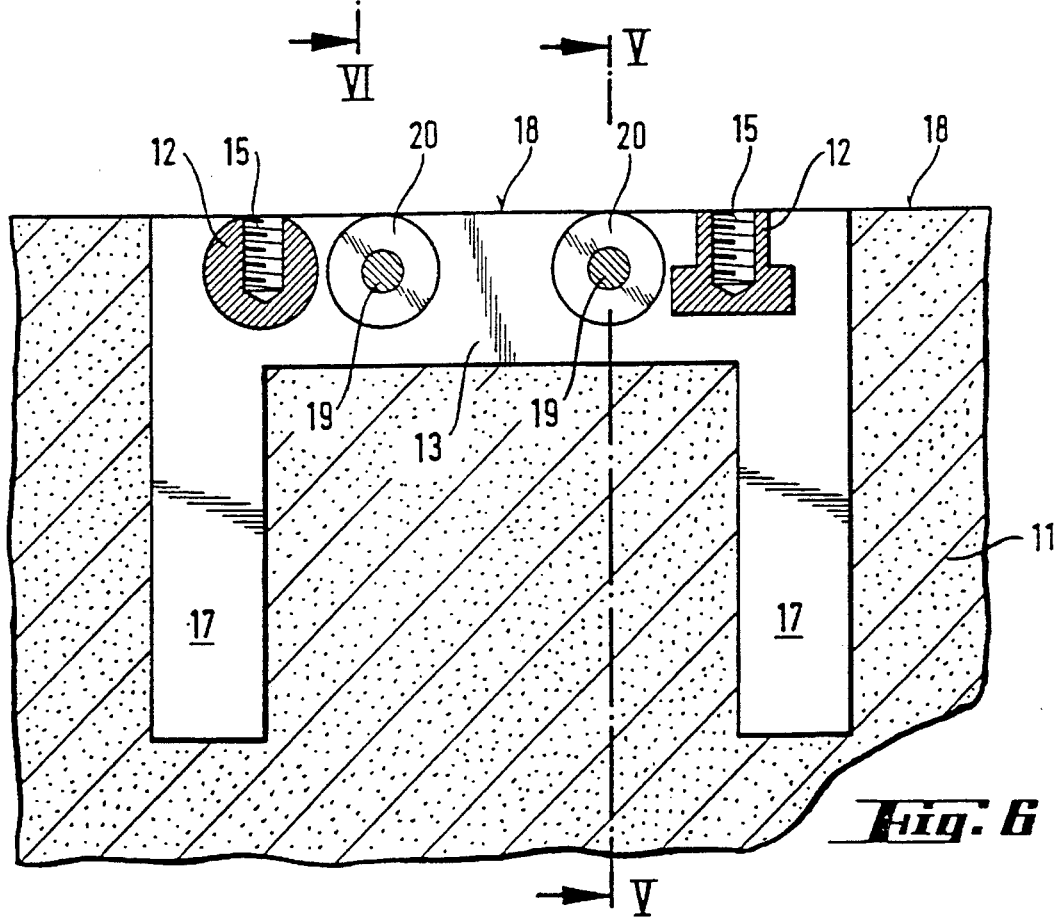
FIG. 6 is a cross-sectional view of the embedded unit of FIG. 5 corresponding to Line VI—VI in FIG. 5.

In FIGS. 5 and 6, the rods 12 are arranged transversely to a plurality of metal sheets 13 projecting into the concrete material 11. The rods 12 are connected with the metal sheets 13 in a form-locking manner, in which case the surfaces of the rods assigned to the bearing element and the front edges of the metal sheets are situated in a plane 18 with the surface of the concrete foundation. The metal sheets are clamped together by means of screw bolts 19. The damping joints 14 are formed by the embedding of spacers 20.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A supporting and fixing arrangement fabricated as an embedded unit in a concrete foundation and forming an elastic bearing for a machine, comprising:

a plurality of rods and metal sheets connected with one another; and damping joints formed between surfaces of said rods and sheets connected with one another, said damping joints being filled with a concrete material.

2. An arrangement according to claim 1, wherein said plurality of rods includes a grid made of individual rods having tapholes for fastening said embedded unit to adjacent structure, said plurality of metal sheets being arranged between said individual rods in said grid and projecting into said concrete foundation;

wherein surfaces of said individual rods and front edges of said metal sheets are arranged in a plane with a surface of said concrete foundation.

3. An arrangement according to claim 2, wherein said metal sheets have a U-shaped construction, the two legs of said U-shaped construction projecting into the concrete foundation.

4. An arrangement according to claim 3, wherein the damping joints are formed by said rods and said metal sheets fitted together by interrupted weld seams and weld points while forming said damping joints between the adjacent surfaces.

5. An arrangement according to claim 3, wherein the damping joints are formed by the plurality of rods and metal sheets clamped together by screw bolts while forming damping joints.

6. An arrangement according to claim 1, wherein the damping joints are formed by spacers.

7. An arrangement according to claim 2, wherein the damping joints are formed by said rods and said metal sheets fitted together by interrupted weld seams and weld points while forming said damping joints between the adjacent surfaces.

8. An arrangement according to claim 2, wherein the damping joints are formed by the plurality of rods and metal sheets clamped together by screw bolts while forming damping joints.

9. An arrangement according to claim 8, wherein the damping joints are formed by spacers.

10. An arrangement according to claim 1, wherein said embedded unit includes individual rods having tapholes for fastening said embedded unit to adjacent structure, said individual rods being arranged transversely and connected in a form-locking manner with respect to said plurality of metal sheets which project into said concrete foundation;

wherein surfaces of said individual rods assigned to said bearing element and front edges of said metal sheets are situated in a plane with a surface of said concrete foundation.

11. An arrangement according to claim 10, wherein said metal sheets have a U-shaped construction, the two legs of said U-shaped construction projecting into the concrete foundation.

12. An arrangement according to claim 10, wherein the damping joints are formed by said rods and said metal sheets fitted together by interrupted weld seams and weld points while forming said damping joints between the adjacent surfaces.

13. An arrangement according to claim 10, wherein the damping joints are formed by the plurality of rods and metal sheets clamped together by screw bolts while forming damping joints.

14. An arrangement according to claim 13, wherein the damping joints are formed by spacers.

15. An arrangement according to claim 1, wherein the damping joints are formed by said rods and said metal sheets fitted together by interrupted weld seams and weld points while forming said damping joints between the adjacent surfaces.

16. An arrangement according to claim 1, wherein the damping joints are formed by the plurality of rods and metal sheets clamped together by screw bolts while forming damping joints.

17. An arrangement according to claim 16, wherein the damping joints are formed by spacers.

* * * * *